United States Patent
Ziliani et al.

(10) Patent No.: US 9,346,096 B2
(45) Date of Patent: May 24, 2016

(54) TOOL-HOLDER GRIPPER FOR RADIAL PRESSES

(75) Inventors: Massimo Ziliani, Brescia (IT); Daniele Piantoni, Brescia (IT)

(73) Assignee: OP S.r.l., Brescia (IT)

( * ) Notice: Subject to any disclaimer, the term of this patent is extended or adjusted under 35 U.S.C. 154(b) by 1164 days.

(21) Appl. No.: 13/155,874

(22) Filed: Jun. 8, 2011

(65) Prior Publication Data

US 2012/0142508 A1 Jun. 7, 2012

(30) Foreign Application Priority Data

Aug. 20, 2010 (EP) .................................. 10425281

(51) Int. Cl.
*B23Q 3/155* (2006.01)
*B21J 7/14* (2006.01)
*B21D 39/04* (2006.01)
*B21J 13/08* (2006.01)

(52) U.S. Cl.
CPC .................. *B21J 7/14* (2013.01); *B21D 39/048* (2013.01); *B21J 13/085* (2013.01); *B23Q 3/155* (2013.01); *B23Q 3/15566* (2013.01); *Y10T 483/10* (2015.01); *Y10T 483/1731* (2015.01); *Y10T 483/1809* (2015.01)

(58) Field of Classification Search
CPC .................. Y10T 483/1729; Y10T 483/1731; B21J 3/085; B21J 7/14; B21J 13/085; B21D 39/046; B21D 39/048; B23Q 3/155; B23Q 3/15566

USPC .......................................... 483/28, 29; 72/402
See application file for complete search history.

(56) References Cited

U.S. PATENT DOCUMENTS

| | | | | |
|---|---|---|---|---|
| 4,306,442 A | * | 12/1981 | Schrock | 72/402 |
| 4,774,828 A | * | 10/1988 | Schrock | 72/402 |
| 5,243,846 A | * | 9/1993 | Davis et al. | 72/402 |
| 6,519,998 B2 | * | 2/2003 | Ertl et al. | 72/402 |
| 7,043,806 B2 | * | 5/2006 | Schrock et al. | 29/237 |
| 7,497,106 B2 | * | 3/2009 | Beining | 72/402 |
| 7,526,940 B2 | * | 5/2009 | Van Essen | 72/446 |
| 7,553,268 B2 | * | 6/2009 | Ziliani | 483/29 |
| 2007/0186616 A1 | | 8/2007 | Beining | |

FOREIGN PATENT DOCUMENTS

WO 01/33675 5/2001
WO 2004/087349 10/2004

* cited by examiner

*Primary Examiner* — Erica E Cadugan
*Assistant Examiner* — Michael Vitale
(74) *Attorney, Agent, or Firm* — Davis & Bujold PLLC; Michael J. Bujold

(57) ABSTRACT

Tool-holder gripper for a multiple change of tools in a horizontal radial press having a set of jaws moving radially and axially, comprising a handle, a tool-holder disc, and angular centring devices acting in conjunction with a front flange of the press to angularly align the tools and jaws. The gripper is further provided with a radial, axial centring portion configured to abut against the front surface of at least one radial jaw when the tools and jaws are axially aligned but still disengaged, so that the subsequent axial advancement of the jaws is accompanied by a simultaneous axial reversing of the gripper.

8 Claims, 8 Drawing Sheets

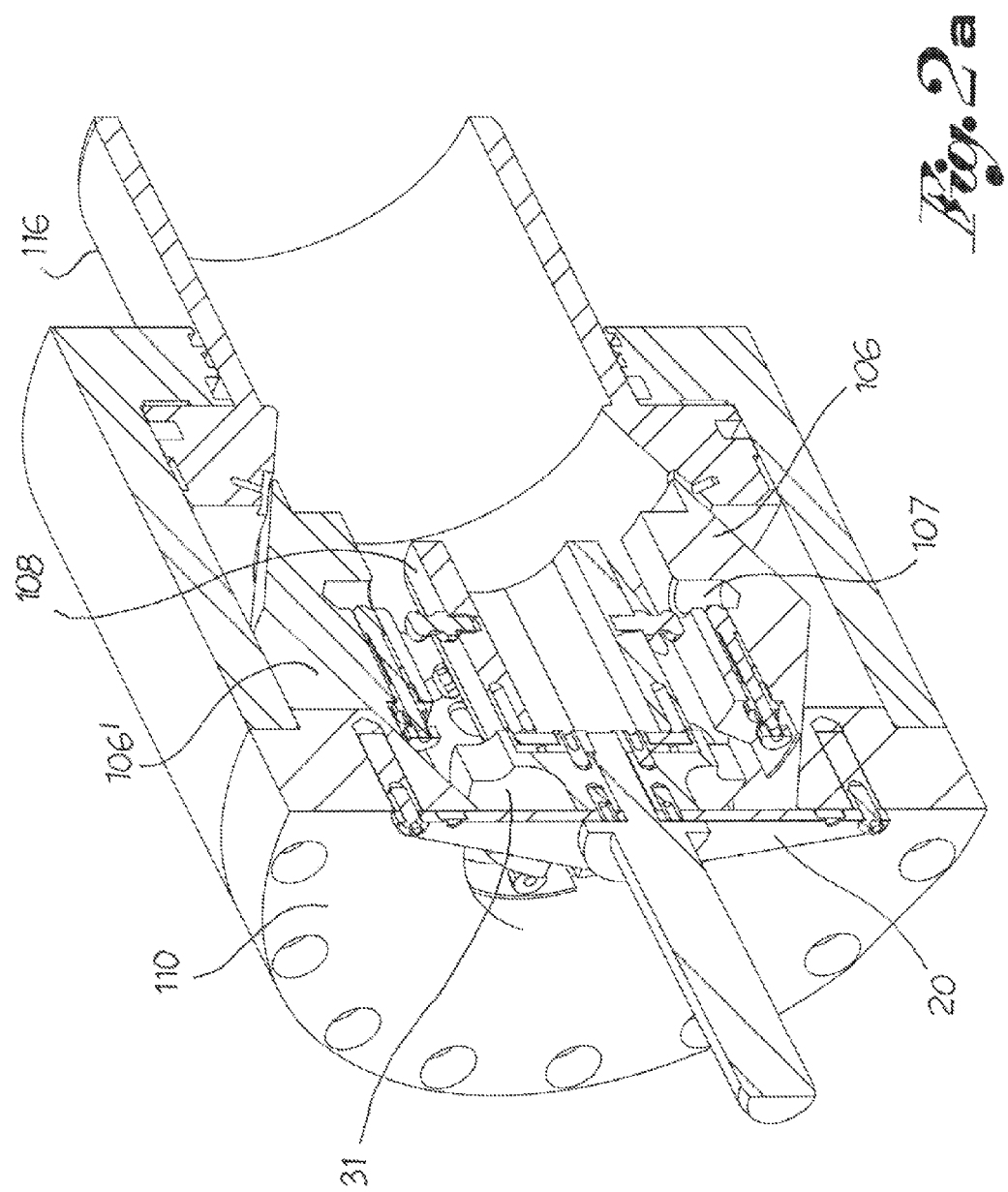

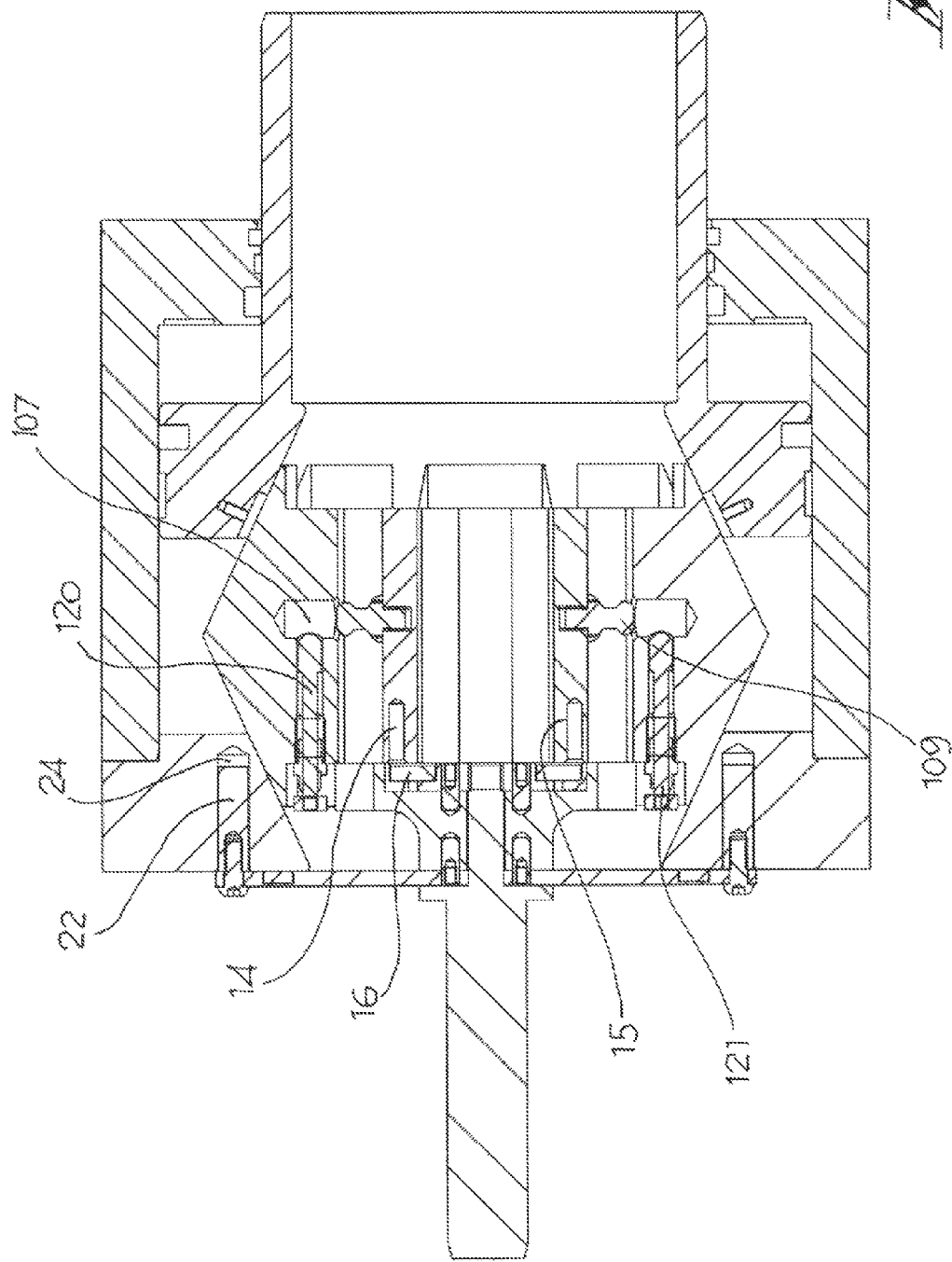

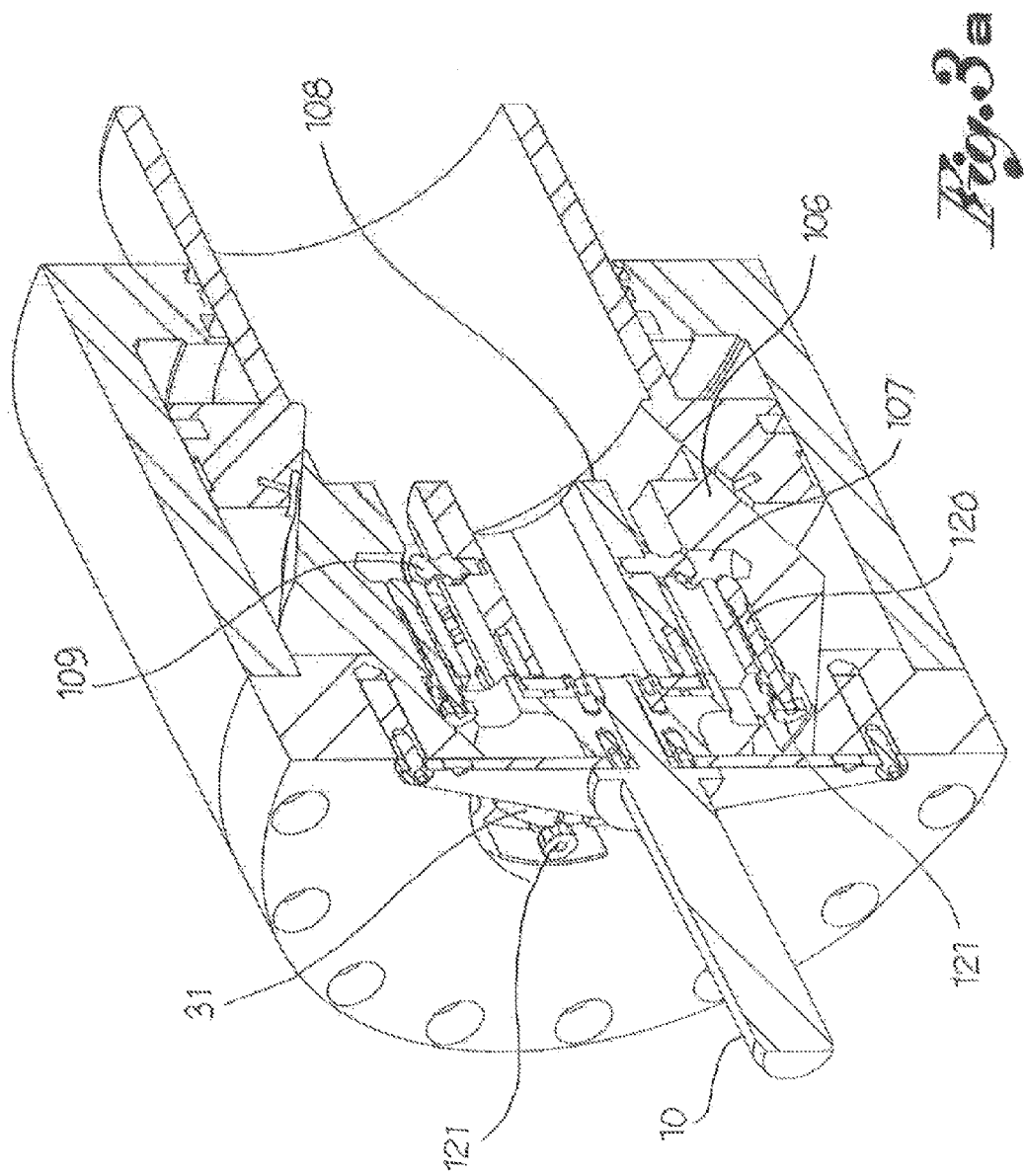

TOOL-HOLDER GRIPPER FOR RADIAL PRESSES

The present invention relates to the radial presses sector, for example for the connection of flexible hoses, and refers in particular to a tool-holder gripper for the multiple and contemporary fitting of a plurality of tools to such presses.

As is known, to perform pressing of parts having different diameters, radial presses are fitted with sets of interchangeable tools, also called clips, substantially composed of blocks for example having a circular sector section, to apply to respective radial jaws, or clip holders, of the press. To facilitate and accelerate tool changing operations, a tool holder gripper configured to contemporarily pick up all the tools required for pressing a tube of a specific diameter from a tool-holder loading magazine and fit them to the press in a single operation and, vice versa, to detach them from the press just as quickly and simultaneously to replace them in the loading magazine, is used.

In one embodiment such tool-holder gripper comprises a handle and a tool-holder disc fitted with a plurality of pegs positioned along a circular crown of the disc, each able to support a respective tool, if necessary with the assistance of magnets attached to the disc.

For assembly to the jaw, each tool is fitted with a radial pin destined to be inserted and blocked in a respective seat provided in the jaw. Once the gripper has been placed in the pressing compartment of the press, the jaws are commanded to close on it until the radial pins are fully inserted in the respective seats. It is clear therefore that at the movement of moving the jaws, the radial pins must be perfectly aligned with their respective seats.

In a previous patent by the same Applicant, a tool-holder gripper was proposed provided with centring devices acting in conjunction with the radial press to ensure the alignment of the radial pins with the respective seats at the moment of fitting the tools to the jaws of the press. In particular, the gripper comprises an angular centring plate able to lie against a front flange of the press, said press and said front flange having complementary centring devices.

Such tool-holder gripper can be used with both horizontal and vertical radial presses in which the jaws perform only a radial movement in relation to a horizontal axis of the press.

There is however a type of horizontal radial press, widely used moreover, in which the jaws contemporarily perform both a radial movement in relation to the horizontal axis of the press and an axial movement along such axis. This combined movement of the jaws is due to the fact that they have an outer radial surface with a double cone profile which a piston situated behind the jaws acts on, coaxially to the horizontal axis of the press.

The tool-holder gripper mentioned above is not suitable for use with such a horizontal radial press, in that the axial shifting of the jaws would interfere with the radial pins of the tools, causing their breakage.

The purpose of the present invention is to propose a tool-holder gripper able to overcome the problem of alignment of the tools and jaws in horizontal radial presses where the jaws shift axially as well as radially.

Such purpose is achieved by a tool-holder gripper and by an assembly method of the tools according to the present invention. The dependent claims describe preferred or advantageous embodiments of the tool-holder gripper.

The characteristics and advantages of the tool-holder gripper according to the invention will however be clear from the description given below, made by way of a non-limiting example, of its preferred embodiments with reference to the attached drawings, wherein:

FIGS. 2 and 2a are two axial section views of the tool-holder gripper according to the invention inserted in a radial press, in an initial position of the tool fitting procedure, FIGS. 3 and 3a are two analogous views to the previous, in an intermediate phase of the tool fitting procedure;

Figure 1:
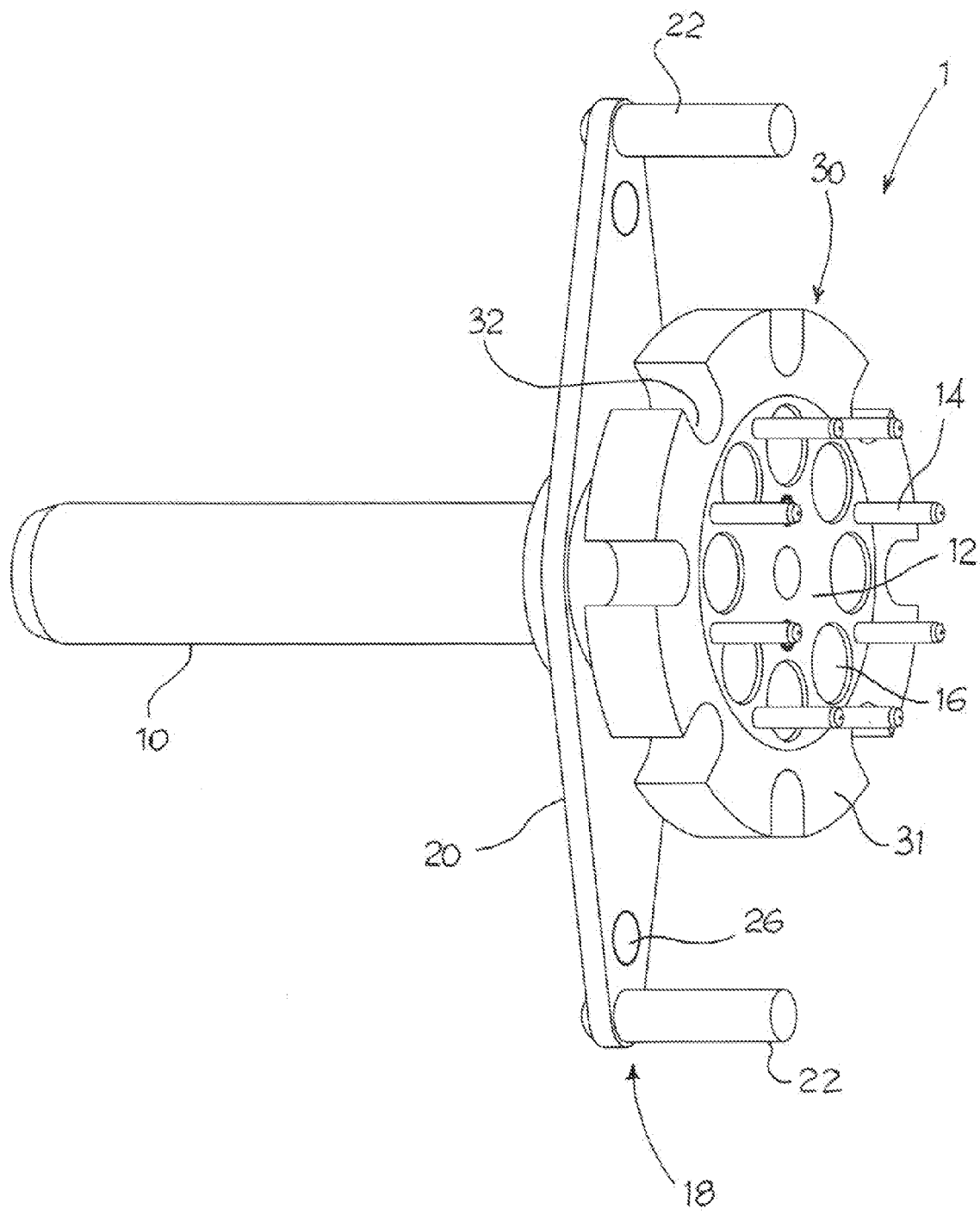
FIG. 1 shows a perspective view of a tool-holder gripper according to the present invention.

In said drawings, reference numeral 1 globally denotes a tool-holder gripper according to the invention.

The tool-holder gripper 1 is able to perform a multiple change of tools in a horizontal radial press 100. Such press comprises a frame 102 centrally defining a pressing compartment 104 in which a plurality of radial jaws 106 are positioned. Such radial jaws 106 are positioned around a horizontal axis X of the press and are able to receive respective tools or clips 108.

The press 100 comprises a front flange 110 delimiting an access aperture 112 to said pressing compartment 104.

The radial jaws 106 are commanded by actuator devices 114 able to cause, in a fitting phase of the tools onto the relative jaws, a radial shift of the jaws 106 in relation to the horizontal axis X of the press and contemporarily an axial shift along said horizontal axis X in the direction of the front flange 110 of the press. In one embodiment, the actuator devices 114 comprise an actuation piston 116 positioned behind the jaws 106, coaxially to the horizontal axis X of the press. The jaws have, on their outer radial surface, a double cone profile 106' with which a front portion 116' of the actuation piston 116 co-operates, counter-shaped to said double cone profile 106'. As a result, an axial movement of the piston 116 in a forward direction, in other words towards the front flange of the press, causes, thanks to said double cone profile 106', an axial advancement of the jaws 106 and a contemporary radial approach towards the horizontal axis X of the press. Similarly, a rearward movement of the piston 116 causes an axial shift backwards of the jaws 106 and a contemporary radial distancing from the horizontal axis X.

The tools 108 and the jaws 106 are provided with complementary coupling devices. For example, each tool 108 is provided with a radial pin 109 suitable for inserting in a respective radial seat 107 made in each jaw 106. In one embodiment, a blocking peg 120 of the radial pin 109 is also inserted in each jaw 106, perpendicular to the radial seat 107. Said blocking peg 120, pressed by a spring, blocks the radial pin 109 of the tool to the jaw when it is fully inserted in the seat 107.

In order to simultaneously assemble/detach all the press tools 108 onto/from the respective radial jaws 106, the tool-holder gripper 1 is able to pick up all the tools 108 from a tool-holder magazine, transport and position them in the pressing compartment 104 of the press and vice versa, keeping them in a circular arrangement. This way, when the gripper 1 is inserted in the pressing compartment 104, the tools 108 can be hooked up by the respective jaws 106 when these are commanded to close by the actuator devices 114.

The tool-holder gripper 1 comprises a handle 10 and a tool-holder disc 12 able to support a set of tools in a circular arrangement. In one embodiment, said tool-holder disc 12 is fitted with a crown of support pegs 14 suitable for being inserted in corresponding holes 15 made in the tools 108. Advantageously, the tool-holder disc 12 is further provided with a crown of support magnets 16 which help to hold the tools 108 firmly against the tool-holder disc 12.

The tool-holder gripper further comprises, between the handle 10 and the tool-holder disc 12, angular centring devices 18 acting in conjunction with the front flange 110 of the press to angularly align the complementary coupling devices of the tools and the jaws.

In one embodiment, said angular centring devices 18 comprise a centring plate 20 able to lie against the front flange of the press. Said centring plate 20 is provided with at least one centring pin 22, preferably two, diametrically opposite the handle, suitable for inserting in a corresponding centring hole 24 made in the front flange of the press.

Consequently, the coupling of the centring plate 20 and the front flange 110 of the press ensures that the radial pins 109 of the tools are aligned angularly with the respective radial seats 107 of the jaws 106. However, such radial alignment is not sufficient in that on account of the shifting of the jaws along the horizontal axis X, the axial alignment of the pins 109 and the seats 107 is also necessary. Axial alignment is taken to mean that the pins 109 and the relative seats 107 must find themselves at the same height along the horizontal axis X of the press, bearing in mind that the seats 107 of the pins move along said axis X until the jaws reach their final position of complete coupling with the tools 108.

To achieve such alignment, the tool-holder gripper 1 comprises at least one radial, axial centring portion 30 configured to abut against the front surface 106" of at least one radial jaw 106, preferably of all the jaws, at least in the terminal phase of the axial advancement of the jaws. In other words, said radial portion 30 projects beyond the radial dimension of the set of tools 108 carried by the gripper 1, so as to abut, at least from a certain height of the axial stroke of the jaws 106, against the front surface 106" of the jaws themselves. The height of the axial stroke starting from which contact between the radial portion 30 and the front surface of the jaws is necessary, is the height at which the radial pins 109 of the tools 108 are aligned axially as well as angularly with the respective seats, despite the radial pins 109 not yet being engaged by the respective radial seats 107. Thanks to the contact between the gripper 1 and the jaws 106, the axial advancement of the jaws 106 corresponds with the contemporary axial reversing of the gripper 1. The synchronised movement of the jaws and of the gripper thereby prevents the body of the jaws from interfering with the radial pins 109 of the tools as it advances and further approaches the tools, causing irreparable damage to the tools and jaws. On the contrary, said synchronised movement enables the radial pins 109 to insert themselves in the respective radial seats 107 of the jaws 106 while the latter advance along the horizontal axis X.

In one possible embodiment, the radial pins can be aligned axially with the respective radial seats 107 and the radial, axial centring portion 30 placed in contact with the front surface 106" of the jaws right from the beginning of the jaw stroke. In this case jaw and gripper move contemporaneously throughout the radial and axial stroke of the jaws. However, given that at the moment of introducing the gripper in the pressing compartment the jaws are in an initial position of total aperture, such embodiment requires that the radial, axial centring portion 30 extends radially well beyond the dimension of the tools. As a result, the access aperture to the pressing compartment must be of a suitable breadth to allow the passage of the radial centring portion 30, but this leads to a reduction of the pressing surface on the side facing the access aperture.

In a preferred embodiment, therefore, the access aperture to the pressing compartment is not specially modified for the new gripper, so as not to alter the performance of the press. The axial, radial centring portion 30 of the gripper does not therefore extend sufficiently to abut against the front surface 106" of the jaws when these are in the initial position of total aperture, but can abut against them only after the jaws have begun to shift radially towards the tools 108.

Advantageously, the reversing of the gripper 1 is guided by the same angular centring devices 18. In particular, the at least one centring peg 22 and the respective hole 24 have an axial extension such as to remain reciprocally engaged at least for an initial phase of reversing of the gripper.

In one advantageous embodiment, the radial, axial centring portion 30 of the gripper 1 extends radially from the tool-holder disc 12. For example, said radial portion is made as an outer annular portion 31 of said tool-holder disc 12 which, projecting radially in relation to the dimension of the tools 108 when supported by the gripper, abuts against the front surface 106" of the jaws 106.

In one embodiment, in said outer annular portion 31 of the tool-holder disc there is a plurality of radial slots 32 able to receive the heads 121 of the blocking pegs 120 projecting from the front surface 106" of the jaws and thereby permit the radial sliding of the jaws in relation to the tool-holder disc.

Preferably, the axial distance between the angular centring plate 20, which when placed in contact with the front flange 110 of the press identifies the initial or starting position of the gripper in the tool fitting procedure, and the tool-holder disc 12 comprising the outer annular portion 31 supporting the jaws, is such that, in said starting position the tool-holder disc 12 is detached from the front surface 106" of the jaws and the tools 108 supported by said disc 12 are in an advanced position in relation to the fully open jaws.

In this initial position, the distance separating the tool-holder disc 12 from the front surface 106" of the jaws is the same as that between the axis of the radial pins 109 of the tools 108 and the axis of the respective radial seats 107 in the jaws 106.

In one advantageous embodiment, the angular centring plate 20 is provided with magnetic devices 26 able to ensure contact between said plate 20 and the front flange 110 of the press when the gripper is in the initial position. This way the correct and repeatable positioning of the gripper at the beginning of the tool fitting procedure is guaranteed.

Figure 2:
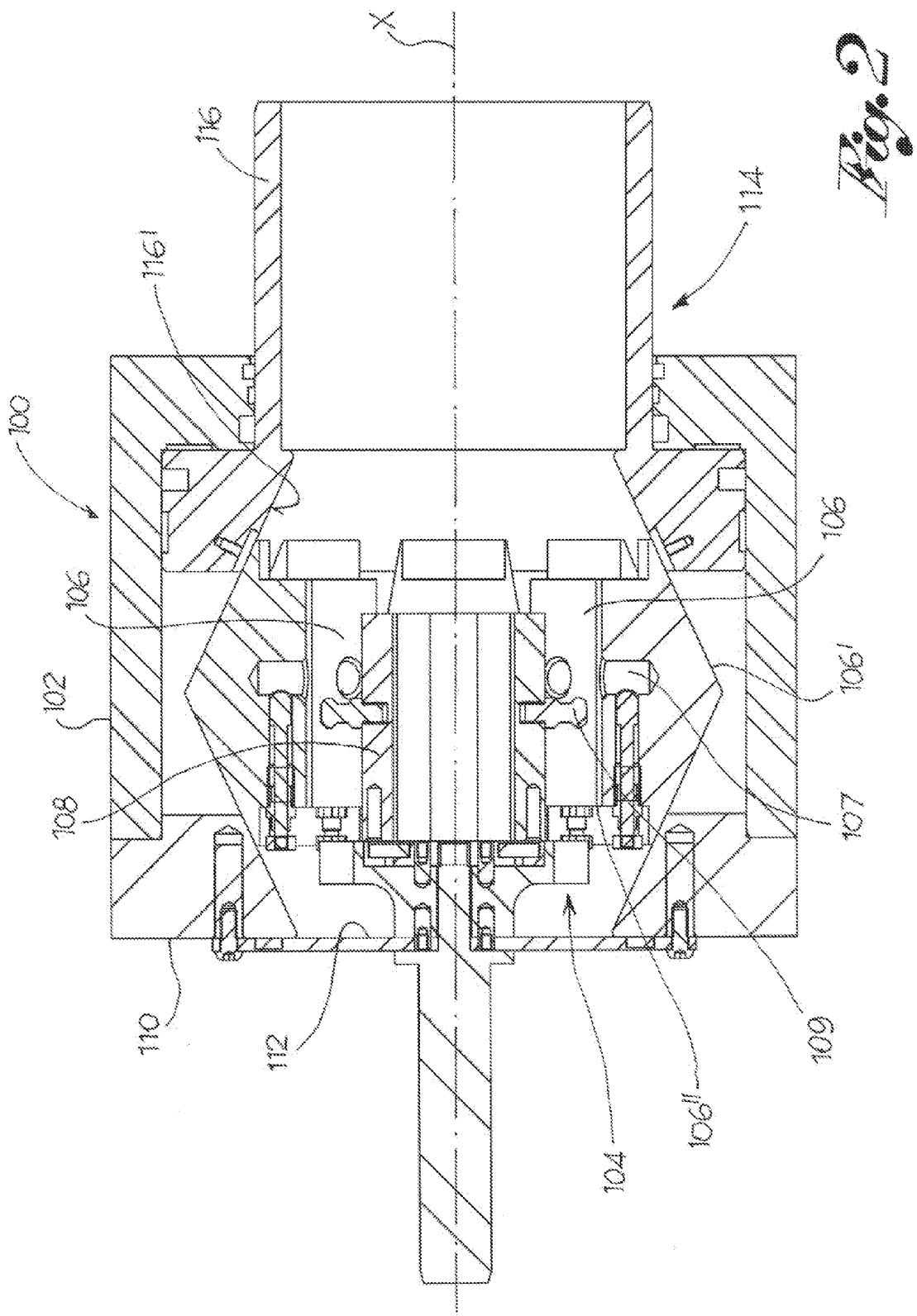

Consequently, the fitting method of the tools foresees an initial position of the gripper inside the pressing compartment, engaging the angular centring plate with the front flange of the press, as described above (FIG. 2). In this initial position of the gripper, the radial pins of the tools are aligned angularly with their respective radial seats in the jaws.

Figure 4:
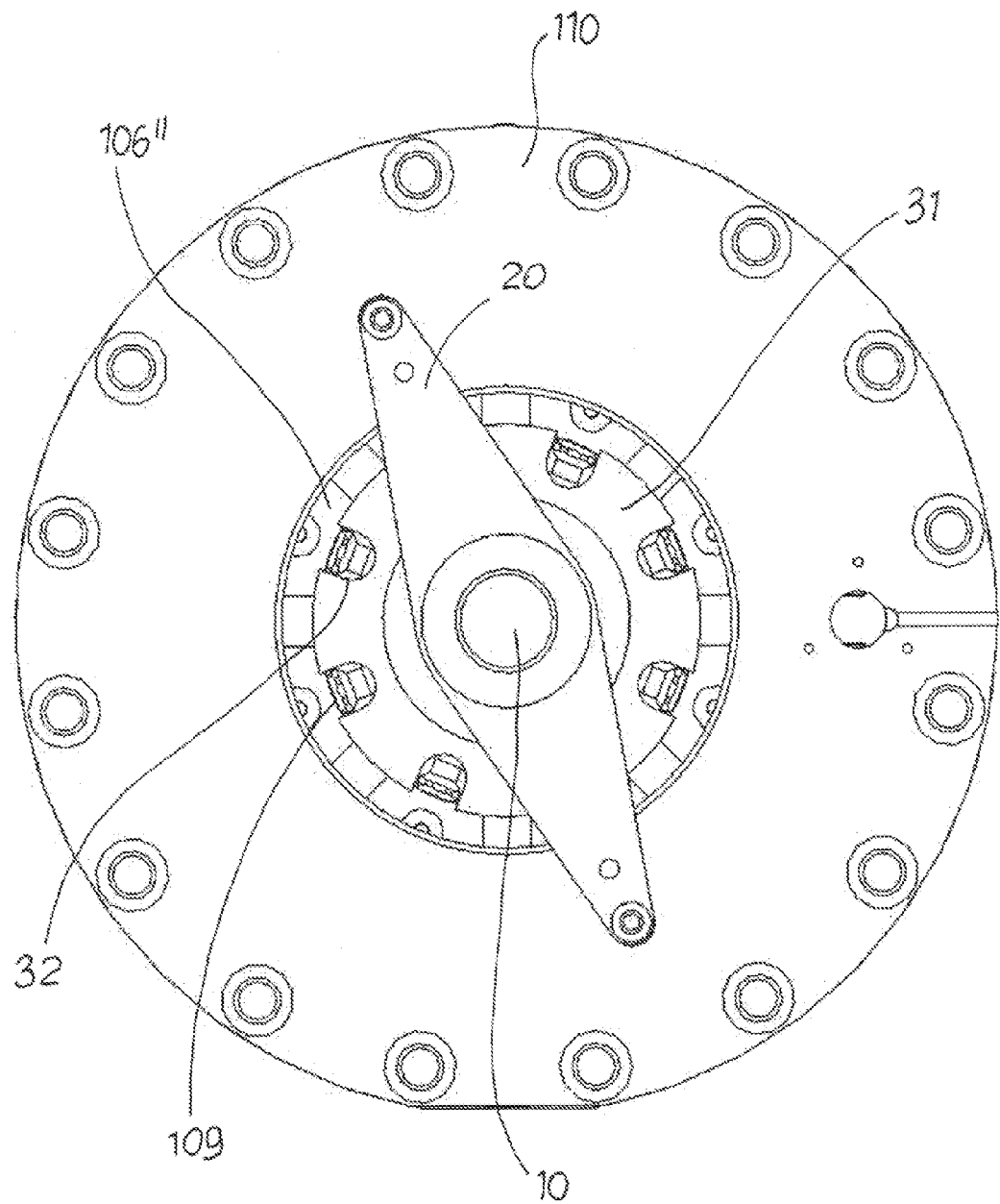
FIG. 4 is a front view of the press with the gripper, again in the intermediate phase of the fitting procedure.

By commanding the actuators of the jaws, the radial and axial shifting of the jaws is started. In one advantageous embodiment, in a first phase of such shifting, the jaws only move whilst the gripper and tools remain still. Following such shifting, the jaws reach an intermediate position in which the radial pins are aligned axially with their respective seats, that is pins and seats find themselves at the same height along the horizontal axis X, and the front surface of the jaws comes into contact with the tool-holder disc (FIGS. 3 and 4).

Figure 5:
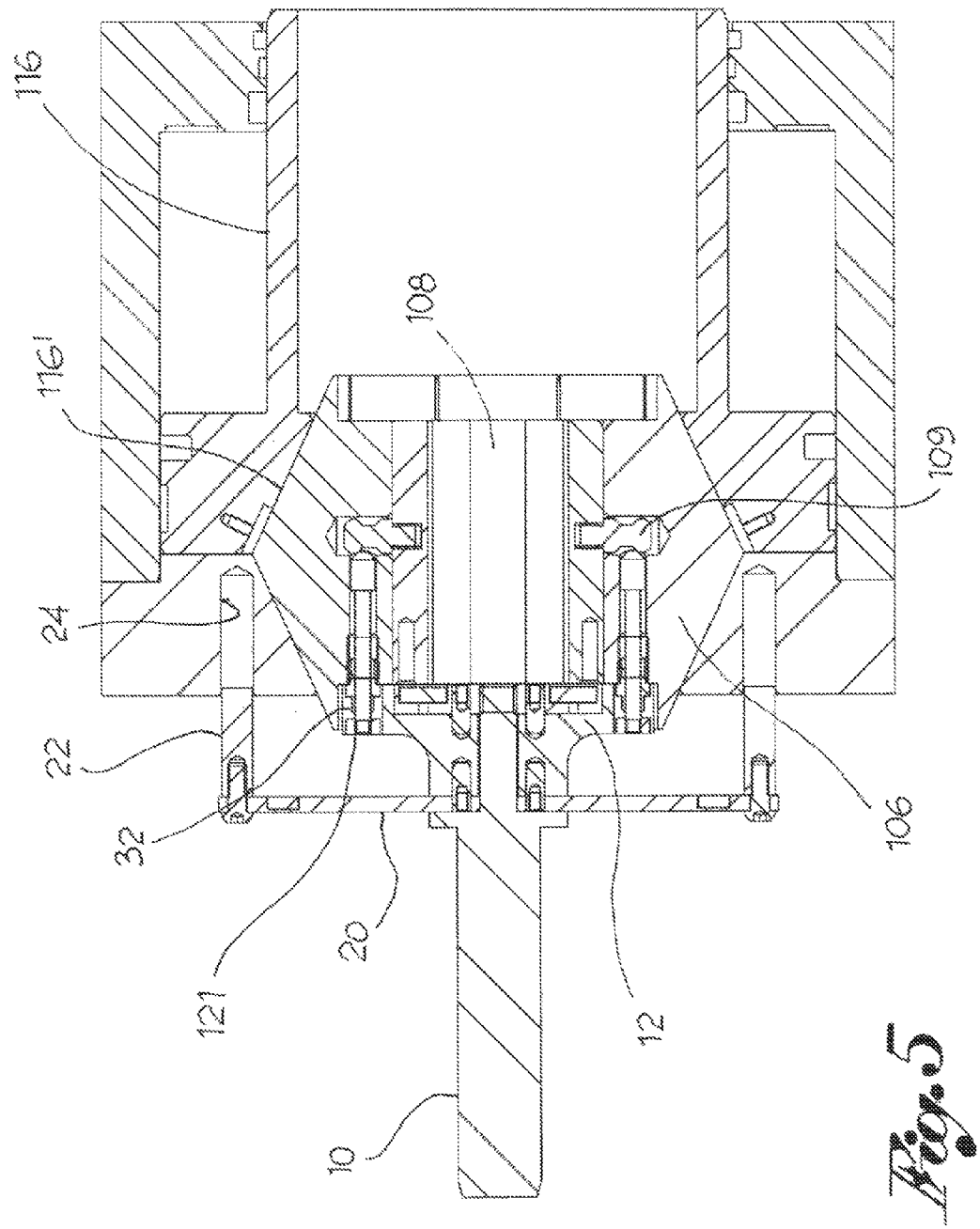
FIGS. 5 and 5a are two axial section views of the tool-holder gripper inserted in a radial press, in the final position of the tool fitting procedure.
Figure 5A:
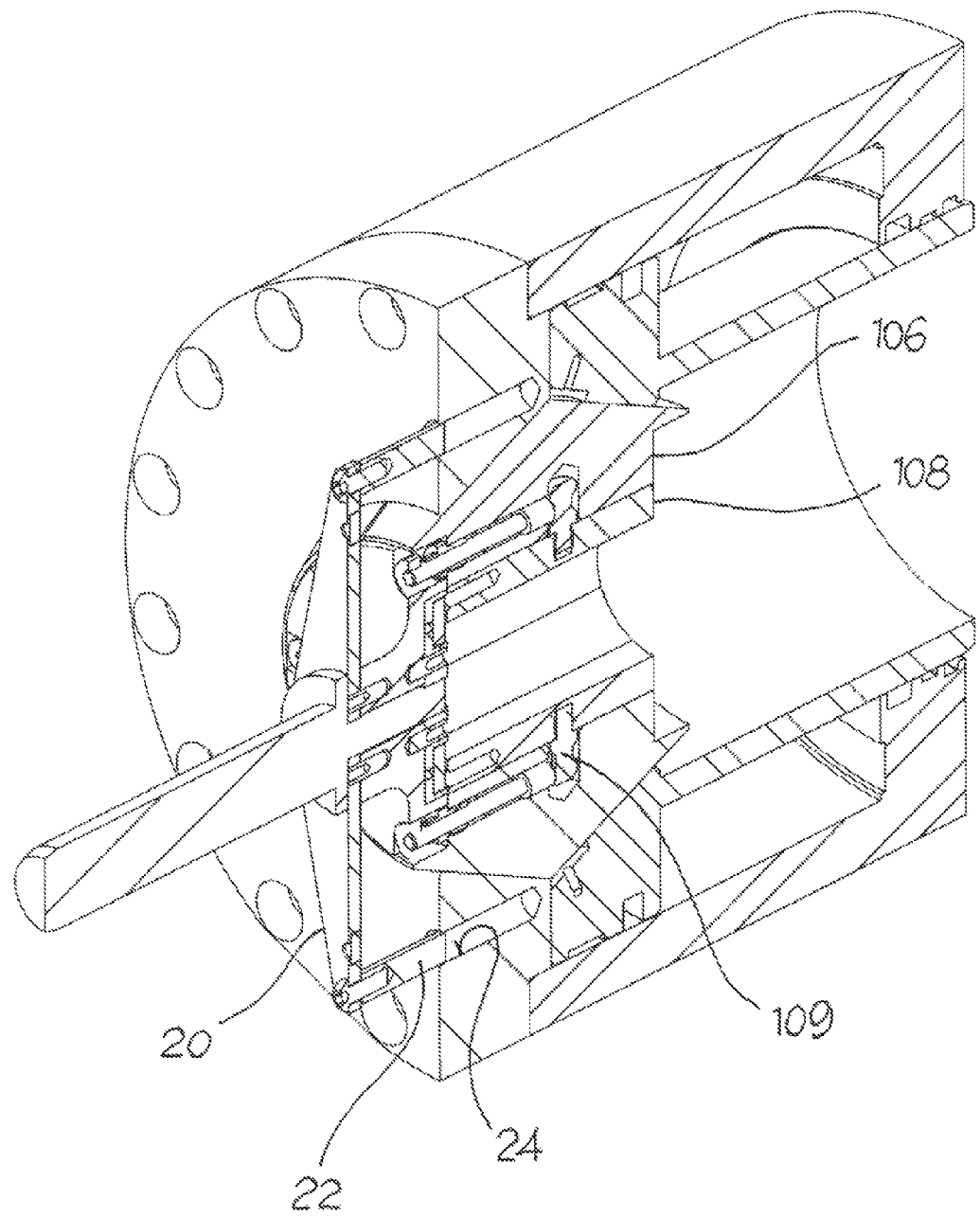

From this point onwards the axial movement of the jaws causes a contemporary reversing of the tool-holder gripper. The front surface of the jaws remains in contact with the tool-holder disc until the end of the jaw stroke. This ensures the synchronous advancement of the jaws and reversing of the tools, and thereby the insertion of the radial pins in the respective seats. Thanks to the radial slots made in the tool-holder disc, the jaws are free to close radially on the tools. At the end of the jaw stroke, the radial pins are completely inserted and blocked in the respective seats (FIG. 5). At this point it is possible to fully extract the gripper from the press and the jaws with the tools fitted to them can return to the starting position.

A person skilled in the art may make modifications, adaptations and replacements of elements with others functionally equivalent to the embodiments of the tool-holder gripper according to the invention so as to satisfy contingent requirements while remaining within the sphere of the following claims. Each of the characteristics described as belonging to a possible embodiment may be realised independently of the other embodiments described.

The invention claimed is:

1. A tool-holder gripper for changing a tool in a horizontal radial press, where said press comprises:
    a plurality of radial jaws, able to receive the tool, and positioned inside a pressing compartment around a longitudinal axis (X) of the press,
    a front flange delimiting an access aperture to said pressing compartment, and
    actuator devices for the jaws able to cause, in a fitting phase of the tool onto the jaws, a radial shift of the jaws in relation to said longitudinal axis of the press and a simultaneous axial shift of the jaws along said longitudinal axis toward the front flange of the press,
    where said tool and said jaws are provided with complementary coupling devices, and where
    the gripper comprises a handle and a tool-holder disc, the gripper comprising, between said handle and said tool-holder disc, angular centering devices acting in conjunction with the front flange of the press to angularly align said complementary coupling devices such that longitudinal axes of complementary coupling devices extend in the same plane,
    the gripper further comprising a centering portion configured to abut against a first surface of at least one radial jaw when said longitudinal axes of said complementary coupling devices are axially aligned along said longitudinal axis, but said complementary coupling devices are still disengaged, so that a simultaneous axial withdrawal of the gripper from said pressing compartment along said longitudinal axis coincides with axial advancement of the jaws along said longitudinal axis toward the front flange of the press.

2. The tool-holder gripper according to claim 1, wherein said angular centering devices comprise a centering plate able to lie against the front flange of the press, said centering plate being provided with at least one centering pin suitable for inserting in a corresponding hole made in the front flange of the press.

3. The tool-holder gripper according to claim 2, wherein said at least one centering pin extends from the centering plate in a direction parallel to the longitudinal axis and interfaces with said hole such as to remain reciprocally engaged with said hole at least for an initial phase of withdrawal of the gripper from said pressing compartment.

4. The tool-holder gripper according to claim 2, wherein the centering plate is provided with magnetic devices able to hold the gripper in contact against the front flange of the press.

5. The tool-holder gripper according to claim 1, wherein said centering portion is made as an outer annular portion having an outer annular portion longitudinal axis extending there through, wherein said outer annular portion is disposed around the circumference of the tool-holder disc and projects radially outward from said outer annular portion longitudinal axis in relation to the tool when supported by the gripper for a tool change, so as to abut against the first surface of the jaws.

6. The tool-holder gripper according to claim 5, wherein the complementary coupling devices between the tool and the jaws comprise a plurality of radial pins which extend from the tool and a radial seat made in each jaw to receive one of said plurality of radial pins, and wherein each jaw is further provided with a blocking peg and each blocking peg is able to engage one of said radial pins when inserted in the corresponding radial seat, and each blocking peg having a head projecting from the first surface of the jaw, there being a radial slot in the outer annular tool portion of the tool-holder disc in correspondence with each blocking peg head.

7. The tool-holder gripper according to claim 1, wherein the tool-holder disc is fitted with a crown of support pegs.

8. The tool-holder gripper according to claim 1, wherein the tool-holder disc is fitted with a crown of support magnets.

* * * * *